United States Patent
Koch

[11] Patent Number: 5,884,565
[45] Date of Patent: Mar. 23, 1999

[54] DEVICE FOR COVERING THE TRACK JOINT BETWEEN THE ROTARY PLATE OF A SWIVEL JOINT AND THE EXPANSION OR CONCERTINA BELLOWS OF AN ARTICULATED VEHICLE

[75] Inventor: Robert Koch, Bad Sooden-Allendorf, Germany

[73] Assignee: Hubner Gummi- und Kunstsoff GmbH, Germany

[21] Appl. No.: 890,474

[22] Filed: Jul. 9, 1997

[30] Foreign Application Priority Data

Jun. 3, 1995 [DE] Germany .................. 295 09 204 U

[51] Int. Cl.⁶ .................................................. B60D 5/00
[52] U.S. Cl. ........................... 105/20; 105/8.1; 280/403
[58] Field of Search ........................ 105/8.1, 18, 20; 280/403; 296/166

[56] References Cited

U.S. PATENT DOCUMENTS

| | | | |
|---|---|---|---|
| 4,257,645 | 3/1981 | Balogh | 276/166 |
| 4,294,485 | 10/1981 | Engelhard | 296/166 |
| 4,583,523 | 4/1986 | Koch | 105/8.1 |
| 5,033,395 | 7/1991 | Bechu et al. | 105/18 |
| 5,060,578 | 10/1991 | Carimentrand | 105/20 |
| 5,259,323 | 11/1993 | Koch et al. | 105/20 |
| 5,280,984 | 1/1994 | Paul et al. | 296/1.1 |
| 5,546,866 | 8/1996 | Koch | 105/8.1 |
| 5,647,282 | 7/1997 | Goebels | 105/20 |

FOREIGN PATENT DOCUMENTS 562598  9/1993  European Pat. Off. ............ 280/403

Primary Examiner—S. Joseph Morano
Attorney, Agent, or Firm—Thomas R. Vigil

[57] ABSTRACT

A fixture for covering the track joint between the rotary plate of the swivel joint and the bellows or concertina walls of an articulated vehicle comprises a frame to hold the track joint covering bellows, the frame (7, 9) having a mouth (11) that can be used to hold the end of the joint covering bellows (5) is place.

7 Claims, 2 Drawing Sheets

DEVICE FOR COVERING THE TRACK JOINT BETWEEN THE ROTARY PLATE OF A SWIVEL JOINT AND THE EXPANSION OR CONCERTINA BELLOWS OF AN ARTICULATED VEHICLE

CROSS REFERENCE TO RELATED APPLICATIONS

This is a continuation of PCT Application No. PCT/DE96/00872 with an international filing date of May 17, 1996, published as WO96/39311 Dec. 12, 1996.

BACKGROUND OF THE INVENTION

1. Field of the Invention

The invention relates to a fixture for covering the track joint between the rotary plate of a swivel joint and the expansion or concertina bellows of an articulated vehicle and comprises a frame to hold the track joint covering bellows. The track joint covering bellows constitutes a tunnel-like hollow, runs parallely to the medium longitudinal axis of an articulated vehicle and angularly to the expansion or concertina bellows. The track joint covering bellows not only serves as a cover for the track joint between the rotary plate and the expansion or concertina bellows, but it also offers the facility to guide supply wires from one part of the vehicle to the other in the tunnel-like hollow constituted by the track joint covering bellows.

2. Description of the related art including information disclosed under 37 CFR §§1.97–1.99

In order for the supplying wires to be accessible, the track joint covering bellows has to be removable. The state of the art provides therefore a connection between the frame and the track joint covering bellows, this connection being particularly characterized in that the frame and the track joint covering bellows are provided with bores through which turn-lock fasteners are protruding, the turn-lock fasteners allowing a positive fastening of the bellows onto the frame. This connection between the track joint covering bellows and the frame is very complicated and thus very expensive to manufacture. Moreover, problems occur in the manufacturing techniques due to the fact that the bores of the bellows and the bores of the frame are not always placed in true alignment so that the turn-lock fastener cannot be led through the corresponding bore.

Several prior art patents are listed below:

| U.S. Pat. No. | Patentee |
| --- | --- |
| 4,257,645 | Balogh |
| 4,294,485 | Engelhard |
| 5,280,984 | Paul et al. |

The Balogh U.S. Pat. No. 4,257,645 does not disclose a fixture for covering the track joint between the rotary plate of the swivel joint and the expansion or concertina bellows of an articulated vehicle, but instead teaches an air- and water-sealed connection being designed as a bellows-like inflatable doughnut. Moreover, the bellows according to this U.S. Patent specification requires a manufacturing implying in the present case that a clamping element incorporated into the material is provided onto the bellows.

The Paul et al. U.S. Pat. No. 5,280,984 discloses a bellows for the connection of two vehicle parts. Such a bellows has at one end a retaining member that can be clampingly received by a corresponding recess in the two vehicle parts connected to each other by means of the bellows. The inconvenience of such a bellows is that the holding elements located on the end of the bellows have always to be fastened separately onto the bellows. Accordingly, a series production is actually not possible. This is all the more true taking into consideration that, if need be, bellows of different lengths have to be used.

SUMMARY OF THE INVENTION

The object of the present invention is therefore to provide a fixture for covering the track joint between the rotary plate of a swivel joint and the bellows of an articulated vehicle allowing the use of bellows of different lengths and without the bellows having to be produced in advance by mounting fixing means.

A solution of this object to provide the frame with a receiving mouth for clamping reception of the end of the joint covering bellows, whereby a connecting profile that can be received by the receiving mouth is arranged on the end of the track joint covering bellows and whereby the connecting profile has a clamping part for reception of the end of the track joint covering bellows.

With such a fixture, the bellows can be manufactured as piece goods which can be cut according to the desired length, and then be clamped by the clamping part of the connection profile that can be received by a corresponding reception element designed as a receiving mouth. A specially made manufacture of the bellows is no more necessary. Thus, such a track joint covering bellows can be manufactured at far lower cost than this was the case according to the state of the art according to U.S. Pat. No. 5,280,984. The clamping part advantageously has teeth for fastening the bellows.

The receiving mouth is advantageously provided with clamping means for clamping the connecting profile. Mounting and dismounting of the fixture is even more easy since the connecting profile can be hung into the receiving mouth. The clamping means is preferably designed as a deformable profile, for example, out of rubber or of caoutchouc, and can be pressed into the receiving mouth under fixation of the connecting profile. More particularly, the profile has a head protruding into the receiving mouth fixating the connecting profile. The head of the profile has got the shape of an arrowhead, so that it can better be pushed into the receiving mouth. The receiving mouth is designed as a claw for the fixation of the connecting profile and of the arrowhead-like head of the deformable profile. That means that the receiving profile has a U-shaped section, the legs having noses projecting towards each other. In its pushed-in position, the profile head is adjacent to the noses and is supported by them from the inside.

The connecting profile has a clamping part for the reception of the joint covering bellows, the clamping part being provided with teeth for fastening the bellows.

DESCRIPTION OF THE PREFERRED EMBODIMENT(S)

Figure 1:
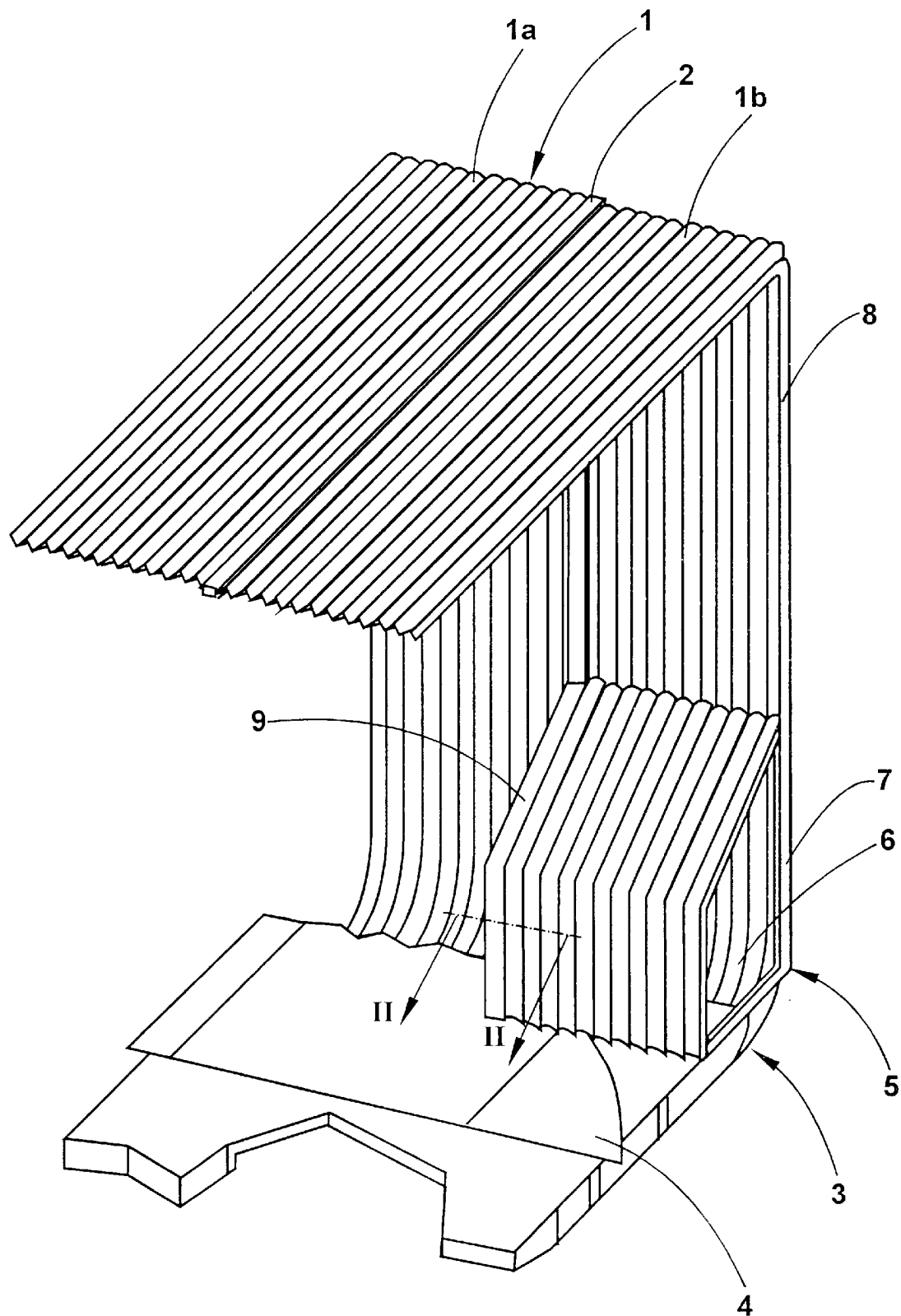
FIG. 1 is a diagrammatic view of the location of a joint covering bellows in the area of a connecting corridor.

The connecting corridor shown in FIG. 1 and referred to with numeral 3 has a bellows 1 with the bellows elements 1a and 1b which are connected to each other by the central frame 2. The connecting corridor referred to with numeral 3 has moreover the rotary plate 4 of a swivel joint which is not shown in detail and which connects the two vehicle parts of an articulated vehicle. The track joint covering bellows 5 is to be found in the area of the split between the rotary plate and the bellows 1. The track joint covering-bellows 5 constitutes a tunnel-like hollow 6 and runs angularly to the bellows 1. The track joint covering bellows is held at each end by a frame 7, fastened onto the frame 8 of the corresponding vehicle part.

Figure 2:
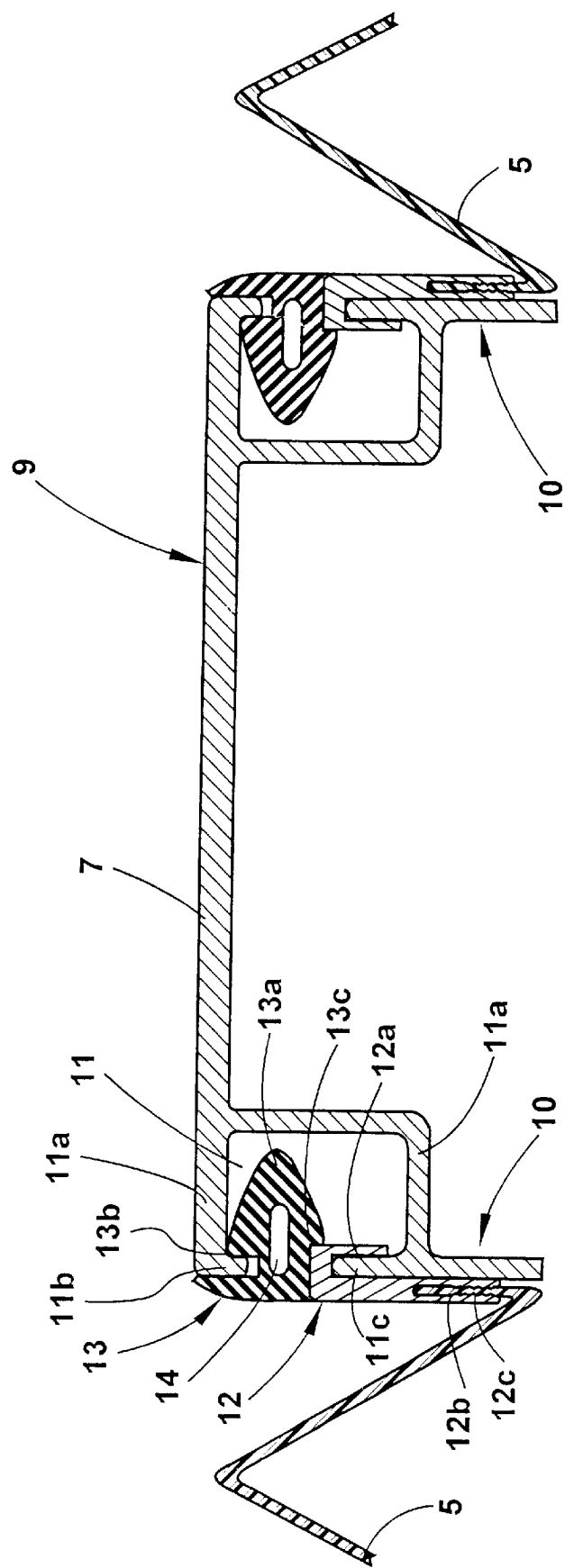
FIG. 2 is a section along the line II—II of FIG. 1.

In the area of the central frame 2, the track joint covering bellows 5 is held by another frame 9 which is connected to the central frame. The frames 7 and 9 are principally identical. The only difference is that the frame 9 is a double frame so that it can receive a track joint covering bellows 5 on each side. Such a double frame is shown in FIG. 2. Since the frame 7 only has to receive the bellows 5 on one side, the frame 7 represents only one half of the frame 9.

According to FIG. 2, the frame for receiving the bellows 5 is referred to with numerals 9 and 7, respectively. The frame 7 or 9 has a U-shaped profile and is provided in the area of its legs 10 with the receiving mouth 11. The U-shaped receiving mouth 11 has the legs 11a, whereas the legs have at their ends noses 11b, 11c projecting towards each other. The connecting profile 12 has a claw 12a at one of its ends by means of which the connecting profile 12 can be hung onto the nose 11c.

On the other end, the connecting profile 12 is provided with a clamping part 12b, that has teeth 12c for the clamping reception of the joint covering bellows 5. A clamping means referred to with numeral 13 is provided for and serves for fastening the connecting profile 12 in the receiving mouth 11. The clamping means 13 is a deformable profile made for example of rubber or caoutchouc and is designed as a border strengthening rubber with a head 13a having the shape of an arrowhead. This border strengthening rubber 13 can be pressed into the receiving mouth, when the connecting profile is placed in the receiving mouth 11. The connecting profile 12 is fastened in the receiving mouth 11 when the flanks 13b and 13c, respectively, of the head 13a of the border strengthening rubber 13 is adjoined the connecting profile 12 or the nose 11b resp. in the way shown in FIG. 2.

In order to facilitate the pressing in of the head 13a of the profile 13, the profile is provided in the area of the head 13a with a hollow 14 that facilitates the squeezing of the border strengthening rubber while bringing it into the receiving mouth.

From the foregoing description, it will be apparent that the track covering bellows of the present invention has a number of advantages, some of which have been described above and others of which are inherent in the invention. Also it will be understood that modifications can be made to the track covering bellows described above without departing from the teachings of the present invention. Accordingly, the scope of the invention is only to be limited as necessitated by the accompanying claims.

I claim:

1. Fixture device for covering a track joint between a rotary plate and an expansion or concertina bellows of a swivel joint in an articulated vehicle comprising a frame to hold a track joint covering bellows, characterized in that a frame (7, 9) has a receiving mouth (11), in that a connecting Profile (12) is arranged at the end of the track point covering bellows (5), this connecting profile (12) being receivable by the receiving mouth (11), in that a deformable-profile (13), having a head (13a) with deflectable shoulders that protrude into the receiving mouth (11) when the connecting profile is inserted therein, is squeezable into the receiving mouth (11) in order to fix the connecting profile (12) in place and in that the connecting profile (12) is provided with a clamping part (12b) for receiving the end of the track joint covering bellows (5).

2. Device according to claim 1, characterized in that the connecting profile (12) is hangable into the receiving mouth (11).

3. Device according to claim 1, characterized in that the clamping means (13) includes said deformable profile that is pressable into the receiving mouth (11) by fastening the connecting profile (12).

4. Device according to claim 1, characterized in that the head (13a) is shaped like an arrowhead.

5. Device according to claim 1, characterized in that the deformable profile (13) is designed as a border strengthening rubber.

6. Device according to claim 1, characterized in that the receiving mouth (11) is designed claw like.

7. Device according to claim 1, characterized in that the clamping part (12b) is provided with teeth (12c) for fastening the track joint covering bellows (5).

* * * * *

UNITED STATES PATENT AND TRADEMARK OFFICE
CERTIFICATE OF CORRECTION

PATENT NO. : 5,884,565
DATED : March 23, 1999
INVENTOR(S) : Robert Koch

It is certified that error appears in the above-indentified patent and that said Letters Patent is hereby corrected as shown below:

On the title page item [57],
    Abstract, line 06, "is" should be --in--;

Amendment B, Column 04, line 18, "point" should be --joint--.

Signed and Sealed this

Fourth Day of January, 2000

Attest:

Attesting Officer

*Acting Commissioner of Patents and Trademarks*